Oct. 30, 1956     V. E. MATULAITIS     2,769,078
ARC MACHINING

Filed Feb. 25, 1953

INVENTOR.
Victor E. Matulaitis
BY
Maxwell R. Murphy
ATTORNEY.

United States Patent Office 2,769,078
Patented Oct. 30, 1956

2,769,078

ARC MACHINING

Victor E. Matulaitis, Franklin, Mich., assignor to Elox Corporation of Michigan, Clawson, Mich., a corporation of Michigan Application February 25, 1953, Serial No. 338,789

17 Claims. (Cl. 219—69)

My invention relates to improvements in methods and apparatus for "metal disintegrating," or as it is sometimes referred to, "arc-machining." For convenience, the art of removing material from a workpiece by means of intermittent electrical discharge will be referred to as "arc-machining," it being understood that my improvements are applicable whether an arc, spark, or discharge having other characteristic is utilized.

During recent years, the art of arc-machining has undergone steady and rapid improvement and tremendous strides have been made in accuracy of dimension and quality of finish, as well as in the production rate.

One serious difficulty encountered concerned localized overheating caused by abnormally heavy flow of current during a phase in the machining operation called "clearing of short-circuits." This condition may be described as follows: During the arc-machining of a workpiece, the machining procedure is interrupted from time to time by a short-circuiting of work and electrode. This short-circuiting may be caused by direct contact of the electrode with the work, but usually is brought about by accumulation of chips or small particles which bridges the gap between the electrode and the work. When such a bridge forms, a direct electrical connection is established and material removal is interrupted and cannot be reestablished until the short-circuit is broken by separation of the electrode and work or breaking of the bridge.

This condition is objectionable for a number of reasons. It interrupts the machining operation thus slowing production. This is a particularly serious objection in the operation of an automatic arc-machining apparatus which ordinarily does not require the constant attention of an operator. More important and objectionable is the localized heating of the work caused by the short-circuit which invariably is caused by a high-resistance connection. This localized heating is characterized by a rapid rise in temperature to an extremely high value and damages the workpiece in most instances. The accuracy of the cut and surface finish of the work are often destroyed to such an extent that the piece must be scrapped. This is a serious matter because workpieces machined by arc-machining methods are always of expensive material.

The principal object of my invention is the elimination of damage to the workpiece by localized overheating during the clearing of short-circuits between the electrode and workpiece.

Another object is to provide a method and means for protecting the equipment from damage caused by overloads resulting from such short-circuits.

A further object is to materially reduce or eliminate power consumption during the clearing of such short-circuits.

A still further object is to provide a method and means for improving the accuracy of dimension and surface finish of the work with improvement in the rate of production.

Other objects and advantages of my invention will appear from the following specification which, taken in conjunction with the accompanying drawings, describes a few of the many forms the invention may assume.

Figure 1:
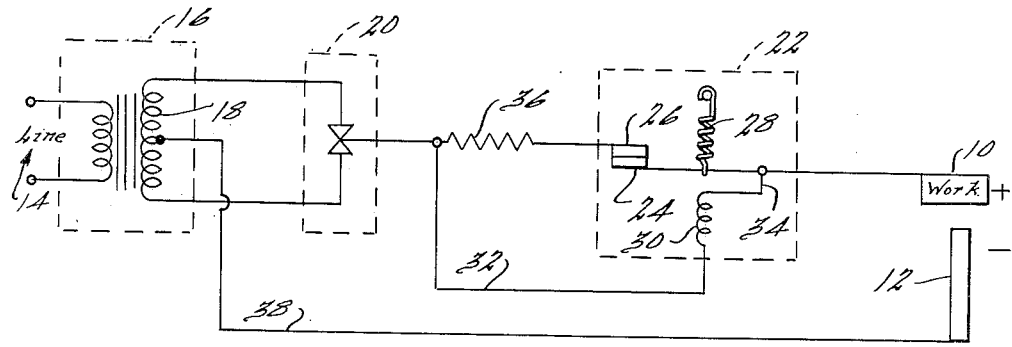
Fig. 1 is a schematic diagram of a circuit embodying the invention in what is probably its simplest form.

Referring now to Fig. 1, it may be seen that a workpiece 10 and an electrode 12 are diagrammatically illustrated. The work is preferably connected to the positive side of the electrical circuit and the electrode to the negative side, but the polarity may be reversed if desired. The electrode may be supported by any suitable means and any suitable power pack and control apparatus may be used to effect the required operation which includes the production of intermittent electrical discharge between the electrode and work in such manner and under such conditions that material is removed from the work and is flushed away by coolant. The details of the specific equipment not essential to the present invention will be omitted for the sake of clarity and conciseness.

The power for the apparatus may be obtained from a regular power line, indicated by numeral 14. A transformer 16 has its primary connected to the line and the secondary 18 thereof connected to a rectifier 20. The latter may be a full-wave or half-wave rectifier of any suitable type capable of changing the A. C. line supply to D. C. of required capacity.

My improvement comprises a relay generally designated by numeral 22. The relay has a pair of contacts 24, 26 held normally closed by a spring 28. A coil 30 is operatively associated with the movable contact 24 and is connected to the output terminal of rectifier 20 by lead 32 and to the workpiece 10 by lead 34. The relay 22 is constructed such that it has sufficient time delay action to prevent chattering of the contacts as is common in the electrical art.

A resistor 36 is connected between the output terminal of the rectifier 20 and the fixed relay contact 26. This resistor is of sufficiently low value so as to cause negligible voltage drop in the system during normal operation, but during a short-circuit condition between electrode 12 and work 10, resistor 36 acts in a de-coupling manner and prevents the output voltage of the rectifier from dropping to zero.

The electrode 12 is connected to the secondary 18 of the transformer 16 by a lead 38.

During normal operation of the apparatus in machining a workpiece, current flows from the secondary 18 through the rectifier 20, thence through the relay contacts 24, 26 and across the gap between the electrode and work and back to the secondary through lead 38. It will be understood of course that other apparatus is used in the operation, for pulsating the voltage to cause the intermittent discharge, for controlling feed and in some instances reciprocation of the electrode, etc. This apparatus forms no part of the present invention and has been omitted from the description in the interest of clarity. For a description of typical apparatus of this type, reference is made to McKechnie et al. Patent No. 2,501,954.

During the aforesaid normal operating cycle there is insufficient voltage across relay coil 30 to overcome the force of the spring 28 the contacts 24, 26 remain closed. In the event of a short-circuit between electrode 12 and workpiece 10, substantially the full voltage of the power supply is applied across the coil 30. This voltage is sufficient to overcome the force of the spring 28 and causes the contacts 24, 26, to open.

Upon opening of the contacts 24, 26, the only current that can flow between the electrode and work must flow through coil 30. The short-circuit current will therefore be instantly reduced to a low value and welding of the electrode to the work and localized heating of the workpiece will be prevented. This condition will prevail as long as the short-circuit continues and liability of damage to both the work and the equipment will be eliminated.

When the short clears the circuit to coil 30 will be temporarily open, thus the contacts 24, 26, will close and normal operation of the machine will be reestablished.

In practically all cases, the short-circuit condition is of short duration and automatically clears itself due to the bridge between the electrode and work being broken by reciprocation of the electrode, movement of the electrode by the automatic feed, by flow of coolant or other cause. If the short does not clear within an appreciable time, the attention of the machine operator is required. If desired, a signal may be arranged to be energized by the circuit to call the operator.

The circuit just described is elementary and is not well adapted to large capacity machines because the entire arc current is carried by the relay contacts which may require a very expensive relay in some instances. This possible objection is eliminated in the arrangement diagrammatically illustrated in Fig. 2. In this figure the same reference characters have been used to designate similar parts.

Here again, the material removing discharge currents are applied in a properly polarized manner such as to cause an arc discharge across the gap between the electrode 12 and work 10. The primary 11 of main transformer 16 is connected to one side of the line 14 in series with an impedance 13. The latter may be a simple resistor or preferably, as shown, an inductance of desired characteristic. The value of the impedance 13 is preferably chosen such that when the contacts 24, 26, of the normally open relay 22 are open, the voltage across the primary 11 of transformer 16 will be approximately 65% to 75% of full line voltage.

The contacts 24, 26, of the time-delay relay 22 are connected across the impedance 13 and the relay coil 30 is connected by leads 15 and 17 in parallel with the gap between the electrode and work.

Operation of this modified circuit is as follows:

When the apparatus is energized with the electrode and work normally separated, approximately 65% to 75% of normal operating voltage will be applied across the gap. This voltage is also applied across the relay coil 30 and is sufficient to overcome the force of spring 28 and close contacts 24, 26. Closure of the contacts shunts the impedance 13 and applies full line voltage across primary 11 of transformer 16. This, in turn, applies full operating voltage across the gap and operation of the arc-machining is initiated.

In event of a short-circuit across the gap, the voltage falls to a low value insufficient to maintain coil 30 energized and spring 28 opens contacts 24, 26. Instantaneously then, the circuit through impedance 13 is reestablished from the line to primary 11. Since the value of the impedance of primary 11 is now greatly reduced because of the short-circuit across the gap, the voltage across impedance 13 will approach line voltage and the current flowing through the series connection of primary 11 and impedance 13 is limited largely by the characteristics of impedance 13 rather than by the short-circuit.

While under the above described conditions some current will still flow through the electrode and workpiece, the value thereof will be very low compared to normal operating current and experience has indicated that this reduced current has no detrimental effect on the work or on the apparatus.

Figure 3:
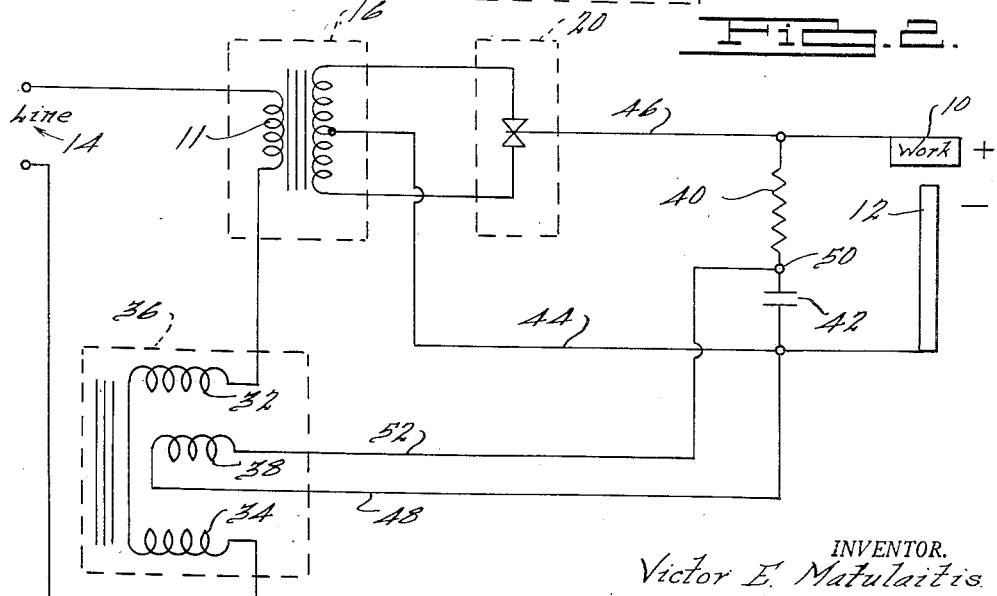
Fig. 3 is a similar diagram of another modified circuit.

Fig. 3 illustrates diagrammatically a second modification wherein the desired result is obtained without the use of relays or moving parts of any kind. This form of the invention is preferred when use of make-and-break contacts or other similar device is undesirable.

In Fig. 3, the circuit to the electrode 12 and workpiece 10 is supplied by suitably polarized voltage by the transformer 16 and rectifier 20. The primary 11 of the main transformer 16 is connected to the power line 14 in series with the A. C. windings 32, 34, of a commercially obtainable core reactor or magnetic amplifier 36. The D. C. winding 38, which acts as the control winding of the reactor may be connected directly across the gap, but is preferably connected through a voltage averaging circuit as shown.

This voltage averaging circuit comprises a resistor 40 and a condenser 42 connected in series across the leads 44, 46, which are connected to the electrode 12 and work 10 respectively. One end of the control winding 38 is connected to the lead 44 by a lead 48 and the other end of the control winding is connected at 50 between the resistor 40 and condenser 42 by a lead 52.

The constants of the reactor 36 are chosen such that when no current is flowing across the arc gap substantially full line voltage is impressed across primary 11 inasmuch as sufficient current will flow from point 50 through control winding 38 to fully saturate reactor 36.

In event of a short-circuit between the workpiece 10 and electrode 12, the voltage across the condenser 42 will fall to substantially zero whereupon windings 32, 34, of the reactor will develop sufficient impedance to reduce the voltage across primary 11 to a negligible value. This in turn, will reduce the current through the short circuit to a low value not damaging to the workpiece.

Figure 2:
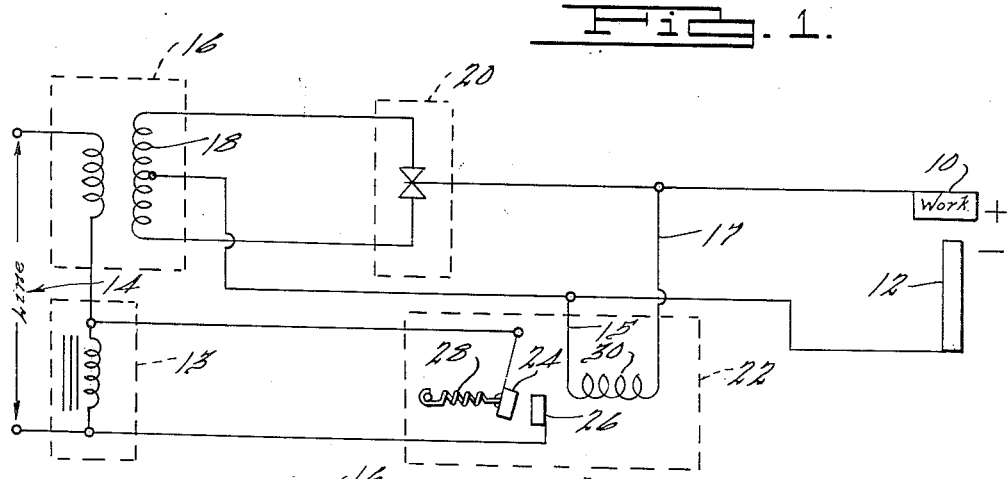
Fig. 2 is a schematic diagram of modified circuit.

In the Figs. 2 and 3 circuits, normal voltage and current values will be restored automatically upon clearing of the short-circuit which, as explained above, usually is of short duration and is usually self-clearing.

It will thus be seen that I have provided relatively simple and inexpensive means for eliminating one of the vexing problems in arc-machining. Even though the chips produced by the process are extremely minute, there is no known method or means whereby the formation of conducting bridges between the work and electrode can be prevented. Sometimes the bridge is formed by a single large chip (especially in precision work) and, more often, by an accumulation of small chips. Any time a bridge forms, current is drawn through a closed circuit and may be of sufficient magnitude to prevent formation of the desired arc. Since the bridge is usually composed of loosely adhering minute particles, it constitutes a high-resistance connection and severe localized heating occurs. This heating is unusually severe because all of the current instantly flows through the bridge instead of being averaged or dispersed over an appreciable area of the work as is the case in normal arc-machining.

For example, with a peak short-circuit current of one hundred amperes flowing through the arc circuit, a one volt difference of potential between the electrode and work across a short-circuit would result in a power dissipation of one hundred watts. Obviously such an expenditure of energy on an area having a diameter of only a thousandth of an inch or less will result in generation of an extremely high temperature with attendant injury to the work.

While but a few of the many forms of the invention have been disclosed for the purpose of teaching the principles thereof, it is to be understood that I do not thereby intend to limit myself to the precise disclosures hereof but only as set forth in the claims hereto appended.

I claim:

1. In an apparatus for removing material from a workpiece by electrical discharge across a gap between an electrode and the workpiece, means for limiting the flow of current through the electrode under conditions when said gap is bridged comprising, a low-impedance electrical circuit connecting the power supply with the electrode and workpiece, a high-impedance electrical circuit operatively associated with the low-impedance circuit, means operable in response to bridging of said gap to simultaneously disestablish the low-impedance circuit and establish the high-impedance circuit.

2. In an apparatus for removing material from a workpiece by electrical discharge across a gap between an electrode and the workpiece, means for limiting the flow of current through the electrode under conditions when said gap is bridged comprising, a low-resistance electrical circuit connecting the power supply with the electrode and workpiece, a high-resistance electrical circuit operatively associated with the low-resistance circuit, means operable in response to bridging of said gap to simultaneously disestablish the low-resistance circuit and establish the high-resistance circuit.

3. In an apparatus for removing material from a workpiece by electrical discharge between an electrode and the workpiece, means for limiting the flow of current through the electrode circuit under conditions when the electrode and workpiece are short-circuited comprising means operable in response to a drop in voltage in the electrode circuit to open the circuit between the electrode and the power supply and simultaneously establish a current limiting circuit therebetween.

4. In an apparatus for removing material from a workpiece by electrical discharge across a gap between an electrode and the workpiece, means for limiting the flow of current through the electrode circuit under conditions when the gap is bridged comprising means operable in response to bridging of said gap to open the circuit between the electrode and the power supply and simultaneously establish a current limiting circuit therebetween.

5. The combination set forth in claim 4 wherein the electrode circuit includes relay means having contacts normally closed during operation of the apparatus and a coil operable to open said contacts in response to increase in current flow in said circuit.

6. The combination set forth in claim 4 which further comprises, a relay having normally closed contacts connecting the power supply with the discharge circuit and a relay coil connected in shunt relation with said contacts, said coil being operable in response to rise in current flow therethrough to open said contacts whereby the discharge circuit is supplied solely through said coil.

7. In an arc-machining apparatus, an electrode, means for disposing the electrode in proximity to a workpiece, circuit means connecting the electrode and workpiece with the power supply thereby establishing an arc-supply circuit, said circuit means comprising, a transformer, a rectifier connected in the secondary circuit of said transformer, a relay connected between the rectifier and the arc-supply circuit, the contacts thereof being normally closed and the coil thereof being connected in shunt around said contacts whereby abnormal rise in current through said coil in response to bridging of the arc-gap will open said contacts and cause the arc-supply circuit to be supplied through said coil.

8. The combination set forth in claim 7 wherein a resistor is connected in series with said contacts and the relay coil is connected in shunt with both said contacts and said resistor.

9. In an apparatus for removing material from a workpiece by electrical discharge between an electrode and the workpiece, a main transformer, a normally short-circuit impedance of predetermined value connected in the series with the primary of said transformer, means for limiting the flow of current in the electrode circuit under conditions of short-circuit between the electrode and the workpiece comprising means operable in response to abnormal rise of current in the electrode circuit for opening the short-circuit across said impedance.

10. The combination set forth in claim 9 wherein said last means comprises a relay having normally open contacts connected across said impedance and a coil connected across the electrode circuit.

11. In an apparatus for removing material from a workpiece by electrical discharge between an electrode and the workpiece, a main transformer, a saturable core reactor of predetermined characteristics connected in series with the primary of said transformer, means for limiting the flow of current in the electrode circuit under conditions of short-circuit between the electrode and the workpiece comprising means operable in response to abnormal decrease in voltage in the electrode circuit for unsaturating said reactor.

12. The combination set forth in claim 11 wherein said reactor is provided with an A. C. winding and a D. C. winding, and said D. C. winding is connected across the electrode circuit.

13. The combination set forth in claim 11 wherein said reactor is provided with an A. C. winding and a D. C. winding, and said D. C. winding is connected across the electrode circuit through a voltage averaging circuit.

14. The combination set forth in claim 11 wherein said reactor includes a pair of coils, one coil thereof being connected at one side to one side of the electrode circuit and at its other side to a terminal which terminal is connected to one side of the electrode circuit through a resistor and to the other side of said circuit through a condenser.

15. The process of rapidly machining a conductive workpiece with high accuracy of dimension and excellent surface finish which comprises, establishing a series of electrical discharges between an electrode and the workpiece at predetermined power input while maintaining a gap therebetween, instantaneously reducing the power input to a value insufficient to cause damage to the work because of localized heating in response to bridging of the gap, and instantaneously increasing the power input to said predetermined value in response to restoration of the gap.

16. In an arc machining apparatus, an electrode, means for passing a series of electrical discharges across a gap between said electrode and a conducting workpiece while circulating coolant in the gap comprising, a low resistance electrical circuit connecting the power supply with the electrode and workpiece, a high resistance electrical circuit operatively associated with the low resistance circuit, means operable in response to bridging of said gap to simultaneously disestablish the low resistance circuit and establish the high resistance circuit, and means operable in response to restoration of said gap to simultaneously disestablish the high resistance circuit and establish the low resistance circuit.

17. In an arc-machining apparatus, an electrode, means for passing a series of relatively high-power erosive electrical discharges across a gap between said electrode and a conducting workpiece while maintaining coolant in the gap comprising, means operable automatically in response to predetermined change in voltage across the gap to reduce the power across the gap to a value insufficient to damage the workpiece through localized heating and operable automatically in response to restoration of the gap to restore full power across the gap.

References Cited in the file of this patent

UNITED STATES PATENTS

| 1,005,575 | Rany et al. | Oct. 10, 1911 |
| 2,192,555 | Moreless | Mar. 5, 1940 |
| 2,214,868 | Welch | Sept. 17, 1940 |
| 2,340,114 | Duis | Jan. 25, 1944 |
| 2,501,954 | McKechnie et al. | Mar. 28, 1950 |
| 2,569,113 | Podolsky | Sept. 25, 1951 |

FOREIGN PATENTS

| 595,697 | Great Britain | Dec. 12, 1947 |